United States Patent
Tutin et al.

(10) Patent No.: US 8,193,107 B2
(45) Date of Patent: Jun. 5, 2012

(54) MODIFIED BINDERS FOR MAKING FIBERGLASS PRODUCTS

(75) Inventors: Kim Tutin, East Point, GA (US); John B. Hines, Atlanta, GA (US); Stacey L. Wertz, Conyers, GA (US); Kelly A. Shoemake, Atlanta, GA (US); Ramji Srinivasan, Alpharetta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 12/860,446

(22) Filed: Aug. 20, 2010

(65) Prior Publication Data

US 2011/0060095 A1    Mar. 10, 2011

Related U.S. Application Data

(60) Provisional application No. 61/235,652, filed on Aug. 20, 2009.

(51) Int. Cl.
- *D04H 1/64* (2012.01)
- *C08L 79/00* (2006.01)
- *C09J 179/00* (2006.01)

(52) U.S. Cl. ............ 442/180; 525/390; 524/509
(58) Field of Classification Search ............ 442/180; 525/390; 524/509
See application file for complete search history.

(56) References Cited

U.S. PATENT DOCUMENTS

| | | | |
|---|---|---|---|
| 5,670,571 A | 9/1997 | Gabrielson et al. | |
| 5,932,665 A | 8/1999 | DePorter et al. | |
| 6,331,350 B1 | 12/2001 | Taylor et al. | |
| 6,734,232 B2 | 5/2004 | Hagiopol | |
| 6,906,130 B2 | 6/2005 | Tutin et al. | |
| 2007/0027283 A1* | 2/2007 | Swift et al. | 527/312 |
| 2007/0123679 A1 | 5/2007 | Swift et al. | |
| 2007/0123680 A1 | 5/2007 | Swift et al. | |
| 2007/0142596 A1 | 6/2007 | Swift et al. | |
| 2007/0292618 A1 | 12/2007 | Srinivasan et al. | |
| 2007/0292619 A1 | 12/2007 | Srinivasan et al. | |
| 2008/0064284 A1 | 3/2008 | Srinivasan et al. | |
| 2008/0064799 A1 | 3/2008 | Srinivasan et al. | |
| 2008/0280787 A1 | 11/2008 | Rediger et al. | |
| 2010/0320113 A1* | 12/2010 | Swift | 206/524.1 |
| 2011/0190425 A1* | 8/2011 | Swift | 524/35 |

FOREIGN PATENT DOCUMENTS

| | | |
|---|---|---|
| GB | 1459841 | 12/1976 |
| GB | 1459841 A * | 12/1976 |
| WO | 98/34885 A1 | 8/1998 |
| WO | 00/12803 A1 | 3/2000 |
| WO | WO 0012803 A1 * | 3/2000 |
| WO | 02/051936 A1 | 7/2002 |
| WO | 02/068525 A1 | 9/2002 |
| WO | 2007/014236 A2 | 2/2007 |
| WO | 2008/127936 A2 | 10/2008 |
| WO | 2009/006532 A1 | 1/2009 |

* cited by examiner

*Primary Examiner* — Kelechi Egwim
(74) *Attorney, Agent, or Firm* — Michael S. Kerns; Ram W. Sabnis

(57) ABSTRACT

Binder compositions for making fiberglass products and methods for making and using same are provided. The binder composition can include a phenol-aldehyde resin or a mixture of Maillard reactants and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes.

22 Claims, 4 Drawing Sheets

MODIFIED BINDERS FOR MAKING FIBERGLASS PRODUCTS

CROSS-REFERENCE TO RELATED APPLICATIONS

This application claims priority to U.S. Provisional Patent Application having Ser. No. 61/235,652, filed Aug. 20, 2009, which is incorporated by reference herein.

BACKGROUND

1. Field

Embodiments of the present disclosure generally relate to binder compositions. More particularly, embodiments relate to binder compositions for making fiberglass products.

2. Description Of The Related Art

Fiberglass insulation provides heat and sound insulation for roof and wall structures in residential and commercial buildings. Fiberglass insulation is often used in an uncompressed mat or blanket form or in a loosefill form. Fiberglass insulation has also been used in a compressed form as insulation for pipes and other conduits, as well as a variety of other molded forms.

The fiberglass insulation products are typically bound or held together with a binder that is applied during production of the fiberglass insulation products. Typical binder compositions include resins, such as phenol-formaldehyde (PF), and resins extended with urea, such as phenol-formaldehyde-urea (PFU) resins. These resins are relatively inexpensive and provide a cured fiberglass insulation product with excellent physical properties. Fiberglass insulation suppliers, such as Guardian and Owens-Corning, make fiberglass insulation products using PF or PFU resins. One particular product is marketed by Guardian as Supercube II®. Another product is marketed by Owens-Corning under the name Advanced ThermaCube Plus®.

Another binder system developed for making fiberglass insulation relies upon the catalyzed crosslinking of a relatively low molecular weight (i.e., less than 10,000) polycarboxy polymer, particularly a polyacrylic acid polymer. The polycarboxy polymer is cross-linked using a polyol with triethanolamine being a preferred polyol. This binder system is described in U.S. Pat. No. 6,331,350.

More recently, Knauf Insulation has introduced a new line of insulation products made with ECOSE®, which is understood to be based on a mixture of a carbohydrate and an amine reactant capable of participating in a Maillard reaction. This binder is described in U.S. Patent Application Publication Nos. 2007/0027283; 2007/0123679; 2007/0123680; and 2007/0142596.

Despite these advances, there is still a need for improved binder compositions and methods for making and using the same.

SUMMARY

Binder compositions for making fiberglass products and methods for making and using same are provided. In at least one specific embodiment, the binder composition includes a phenol-aldehyde resin or a mixture of Maillard reactants and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes.

In at least one specific embodiment, a fiberglass product includes a plurality of fibers; and an at least partially cured binder composition. The at least partially cured binder composition includes either a phenol-aldehyde resin or a mixture of Maillard reactants and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes.

In at least one specific embodiment, a process for preparing a fiberglass product includes contacting a plurality of fibers with a binder composition. The binder composition includes either a phenol-aldehyde resin or a mixture of Maillard reactants and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes. The contacted fibers can be collected to form a non-woven mat. The non-woven mat can be heated to at least partially cure the binder composition.

DETAILED DESCRIPTION

Figure 1:
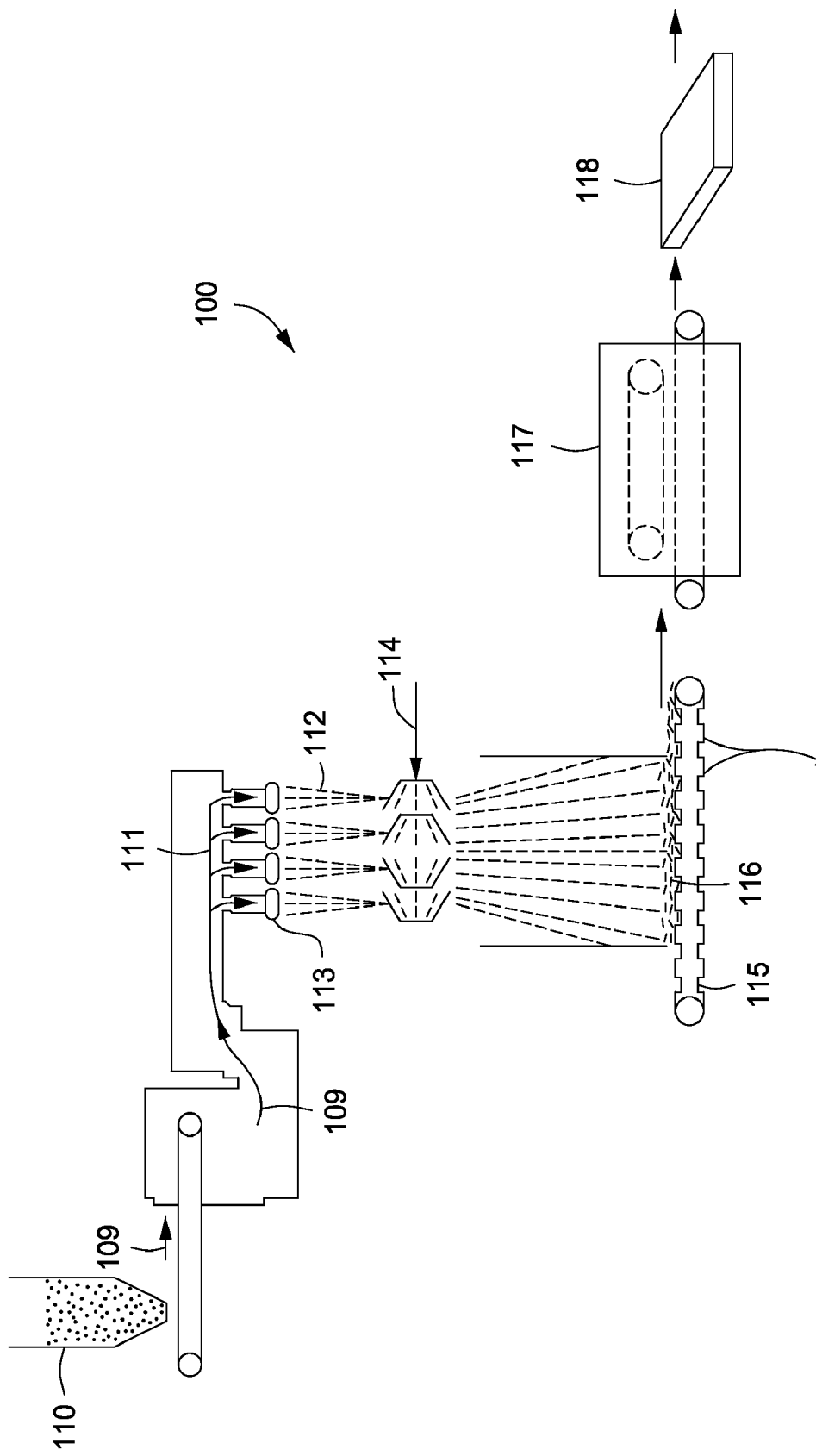
FIG. 1 depicts a schematic of an illustrative system for making a fiberglass product, according to one or more embodiments described.

The modified binder compositions provided herein can be applied to a non-woven fiberglass mat to produce a fiberglass product having acceptable strength properties. For example, the modified binder composition can produce fiberglass products having improved tensile properties including hot/wet tensile strength and/or enhanced dry tensile strength. The improvement in the tensile strength of the fiberglass products provided by the modified binder composition is expected to be significant enough to allow for a reduction in the amount or level of the binder composition that is applied to the fiberglass. This reduced level of binder can be reflected in a characteristically lower percent loss on ignition (i.e., a lower %

LOI) for the fiberglass product. For example, the % LOI for the modified binder compositions provided herein can be reduced by about 2%, about 5%, about 7%, about 10%, about 13%, about 15%, about 17%, about 18%, about 20%, about 23%, about 25%, about 30%, about 33%, or about 35% relative to a control or unmodified binder composition, while still producing fiberglass products having the same or better strength properties. In another example, the % LOI for the modified binder compositions can be reduced by an amount ranging from a low of about 3%, about 5%, or about 10% to a high of about 20%, about 25%, or about 30% as compared to a control or unmodified binder composition, while still producing fiberglass products having the same or better strength properties.

In at least one specific embodiment, the modified binder composition can include one or more modifiers and either a phenol-aldehyde resin or a mixture of Maillard reactants. The modifier can be or include a copolymer comprising one or more vinyl aromatic derived units and at least one of maleic anhydride and maleic acid. In another example, the modifier can be or include an adduct of styrene, at least one of maleic anhydride and maleic acid, and at least one of an acrylic acid and an acrylate. In another example, the modifier can be or include one or more latexes. In another example, the modifier can include two or more of: (1) a copolymer comprising one or more vinyl aromatic derived units and at least one of maleic anhydride and maleic acid; (2) an adduct of styrene, at least one of maleic anhydride and maleic acid, and at least one of an acrylic acid and an acrylate; and (3) one or more latexes.

The copolymer comprising one or more vinyl aromatic derived units and at least one of maleic anhydride and maleic acid can include any suitable vinyl aromatic derived unit(s). Illustrative vinyl aromatic derived units can include, but are not limited to, styrene, alpha-methylstyrene, vinyl toluene, and combinations thereof. Preferably, the vinyl aromatic derived units are derived from styrene and/or derivatives thereof. More preferably, the vinyl aromatic derived units are derived from styrene and the copolymer comprises a styrene maleic anhydride (acid) or "SMA" copolymer. Suitable SMA copolymers include resins that contain alternating styrenic and maleic anhydride (acid) monomer units, arranged in random, alternating, and/or block forms. For example, suitable SMA copolymers can have the following generalized formula in the unneutralized form:

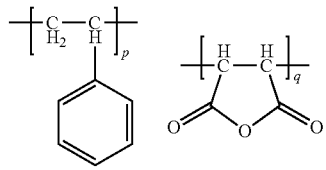

where p and q are positive numbers in a ratio (p:q) that can vary from about 0.5:1.0 to about 5:1.

Unneutralized SMA copolymers can be insoluble in water. Sufficient neutralization of the SMA copolymers in an aqueous environment can solubilize the SMA copolymers. For example, the SMA copolymers can be neutralized in an aqueous environment using an alkaline substance to produce solubilized SMA copolymers. Illustrative alkaline substances can include, but are not limited to, hydroxides such as sodium hydroxide, potassium hydroxide, ammonium hydroxide (e.g., aqueous ammonia), lithium hydroxide, and/or cesium hydroxide; carbonates such as sodium carbonate, potassium carbonate, and/or ammonium carbonate; ammonia and/or an amine (e.g., an alkanolamine). Although it generally is desirable to use the neutralizing agent in an amount sufficient to neutralize 100 mole % ("mol %") of the SMA copolymer, an amount sufficient to obtain water solubility can be used. The level of addition of any particular neutralizing agent to obtain an acceptable degree of water solubility is well within the normal skill in the art and the product of only routine experimentation. For example, about 50 mol %, 60 mol %, 70 mol %, 80 mol %, 90 mol %, or 95 mol % of the SMA copolymer can be neutralized. In one or more embodiments, the amount of neutralization can range from a low of about 40 mol %, about 45 mol %, or about 50 mol % to a high of about 65 mol %, about 75 mol %, or about 90 mol % of the SMA copolymer. As known to those skilled in the art, solubilizing the SMA copolymer can be facilitated at elevated temperature and/or pressure.

The SMA copolymer can include about 7 mol % to about 50 mol % maleic anhydride (maleic acid) and conversely about 50 mol % to about 93 mol % vinyl aromatic derived units. In another example, the copolymer can include from about 20 mol % to about 40 mol % maleic anhydride (maleic acid) and conversely of from about 60 mol % to about 80 mol % vinyl aromatic derived units. In another example, the maleic anhydride (maleic acid) can be present in an amount ranging from a low of about 7 mol %, about 10 mol %, about 12 mol %, or about 15 mol % to a high of about 30 mol %, about 35 mol %, about 40 mol %, or about 45 mol %, based on the total weight of the maleic anhydride (maleic acid) and the one or more vinyl derived units. In still another example, the vinyl aromatic derived units can be present in an amount ranging from a low of about 50 mol %, about 55 mol %, about 60 mol %, or about 65 mol % to a high of about 75 mol %, about 80 mol %, about 85 mol %, or about 90 mol %, based the total weight of the maleic anhydride (maleic acid) and the one or more vinyl derived units.

The SMA copolymer can contain a minor amount (less than 50 mol %, or less than about 40 mol %, or less than about 30 mol %, or less than about 20 mol %, based on the amount of maleic anhydride (maleic acid)) of another unsaturated carboxylic acid monomer such as aconitic acid, itaconic acid, acrylic acid, methacrylic acid, crotonic acid, isocrotonic acid, citraconic acid, and fumaric acid and the mixtures thereof. The SMA copolymer can also contain a minor amount (less than 50 mol %, or less than about 40 mol %, or less than about 30 mol %, or less than about 20 mol %, based on the amount of the vinyl aromatic derived units) of another hydrophobic vinyl monomer. Another "hydrophobic vinyl monomer" is a monomer that typically produces, as a homopolymer, a polymer that is water-insoluble or capable of absorbing less than 10% by weight water. Suitable hydrophobic vinyl monomers are exemplified by (i) vinyl esters of aliphatic acids such as vinyl acetate, vinyl propionate, vinyl butyrate, vinyl caproate, vinyl 2-ethylhexanoate, vinyl laurate, and vinyl stearate; (ii) diene monomers such as butadiene and isoprene; (iii) vinyl monomers and halogenated vinyl monomers such as ethylene, propylene, cyclohexene, vinyl chloride and vinylidene chloride; (iv) acrylates and alkyl acrylates, such as methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, and 2-ethylhexyl acrylate; and (v) nitrile monomers such as acrylonitrile and methacrylonitrile and mixtures thereof.

The molecular weight of the SMA copolymer can vary within wide limits. The SMA copolymer can have a weight average molecular weight ("Mw") of between about 1,000 and about 500,000. For example, the SMA copolymer can have a Mw ranging from a low of about 1,000, about 5,000, about 10,000, about 15,000, or about 20,000 to a high of about 100,000, about 200,000, about 300,000, about 400,000, or about 500,000. In another example, the Mw of the SMA copolymer can range from a low of about 1,000, about 5,000, or about 10,000 up to about 400,000, or about 350,000, or about 300,000, or about 250,000, or about 200,000, or about 175,000, or about 150,000, or about 120,000 or about 100,000, or about 90,000, or about 80,000, or about 70,000, or about 60,000, or about 50,000, or about 40,000, or about 30,000, or about 20,000.

In one or more embodiments, the SMA copolymers can be partially esterified. For example, the SMA copolymers can be partially esterified and can still contain some anhydride groups. The partial esters of the SMA copolymers can be prepared in conventional manners from alkanols of about 3 to 20 carbon atoms, preferably from hexanol or octanol. The extent of the partial-esterification of the SMA copolymers can range from about 5 to 95%, from about 10% to about 80%, from about 20% to about 50%, or from about 15% to about 40%. The esterification can be effected by simply heating a mixture of the appropriate quantities of the SMA copolymers with the alcohol at elevated temperatures, e.g., from about 100° C. to about 200° C. In one or more embodiments, the benzene ring of the SMA copolymers can be substituted with one or more groups. For example, the benzene ring of the SMA copolymers can contain one or more sulfonate groups.

Suitable SMA copolymers are commercially available from numerous companies. For example, suitable SMA copolymers can be purchased from, among others, Polyscope Polymers BV, Sartomer USA, LLC, Hercules, Inc., and Georgia-Pacific Chemical LLC.

As used herein, the term "aqueous" includes water and mixtures composed of water and/or other water-miscible solvents. Illustrative water-miscible solvents can include, but are not limited to, alcohols, ethers, amines, other polar aprotic solvents, and the like.

The modifier can be or include one or more latexes. Illustrative latexes can include, but are not limited to, styrene/acrylic acid ester copolymer, styrene-butadiene rubber, acrylonitrile butadiene styrene, acrylic polymers, polyvinyl acetate, or any combination thereof. The synthetic latexes can be prepared using any suitable process. For example, the styrene/acrylic acid ester copolymer ("SAE") can be the reaction product of a hydrophobic styrene-based monomer and an acrylic acid ester co-polymerized in an emulsion. A suitable SAE copolymer can be prepared as discussed and described in U.S. Pat. No. 6,734,232. A suitable, commercially available SAE can include NOVACOTE® PS, available from Georgia-Pacific Resins, Inc.

The modifier can be or include an adduct or polymer of styrene, at least one of maleic anhydride and maleic acid, and at least one of an acrylic acid and an acrylate. Any suitable acrylic acid or acrylate can be used such as methyl methacrylate, butyl acrylate, methacrylate, or any combination thereof. Preferably, the acrylate is methyl methacrylate ("MMA"). The adduct can be preformed and then added to the phenol-aldehyde resin, the mixture of Maillard reactants, or the combination of the phenol-aldehyde resin and the mixture of Maillard reactants. In another example, the components of the adduct can be individually mixed with the phenol-aldehyde resin, the mixture of Maillard reactants, or the combination of the phenol-aldehyde resin and the mixture of Maillard reactants.

The adduct can be prepared by dissolving the components of the adduct in a suitable solution. Illustrative solutions can include, but are not limited to, aqueous solutions of sodium hydroxide, ammonium hydroxide, potassium hydroxide, and combinations thereof. The solution can be heated to a temperature of about 70° C. to about 90° C. The solution can be held at the elevated temperature until the components are all at least partially in solution. The solution can then be added to the phenol-aldehyde resin, the mixture of Maillard reactants, or the combination of the phenol-aldehyde resin and the mixture of Maillard reactants.

The adduct can be prepared by combining styrene, at least one of maleic anhydride and maleic acid, and at least one of an acrylic acid and an acrylate to form a terpolymer. The amount of styrene in the adduct can range from a low of about 50 wt %, about 55 wt %, or about 60 wt % to a high of about 75 wt %, about 80 wt %, or about 85 wt %, based on the total weight of the adduct. The amount of the maleic anhydride and/or maleic acid in the adduct can range from a low of about 15 wt %, about 20 wt %, or about 25 wt % to a high of about 40 wt %, about 45 wt %, or about 50 wt %, based on the total weigh of the adduct. The amount of the acrylic acid and/or the acrylate in the adduct can range from a low of about 1 wt %, about 3 wt % or about 5 wt % to a high of about 10 wt %, about 15 wt %, or about 20 wt %, based on the total weight of the adduct.

In another example, the acrylic acid or acrylate can be combined with the copolymer of one or more vinyl aromatic derived units and at least one of maleic anhydride and maleic acid to provide the modifier. For example, combining the acrylic acid or acrylate with SMA can form a styrene maleic anhydride methyl-methacrylate terpolymer. In another example, the modifier can also include a physical mixture of styrene acrylic acid and/or styrene-acrylate copolymer and a SMA copolymer. The adduct or polymer of styrene, at least one of maleic anhydride and maleic acid, and at least one of an acrylic acid and an acrylate and the physical mixture of styrene acrylic acid and/or styrene-acrylate copolymer and a SMA copolymer can be prepared according to the processes discussed and described in U.S. Pat. No. 6,642,299.

In one or more embodiments, the binder composition can include any two or more of the modifiers discussed and described above or elsewhere herein. Two or more modifiers can be combined in any amount with respect to one another. For example, the modifier can include a mixture of at least one of SMA and SAE. The amount of the SMA can range from a low of about 1 wt % to a high of about 99 wt %, based on the total weight of the SMA and the SAE. Other suitable combinations of modifiers can include, but are not limited to, a mixture of SMA and SAE, the adduct of styrene, at least one of maleic anhydride and maleic acid, and at least one of an acrylic acid and an acrylate to form a terpolymer mixed with MMA, SMA mixed with one or more latexes, and the like.

The phenol component of the phenol-aldehyde resin can include a variety of substituted phenolic compounds, unsubstituted phenolic compounds, or any combination of substituted and/or unsubstituted phenolic compounds. For example, the phenol component of the phenol-aldehyde resin can be phenol itself (i.e., mono-hydroxy benzene). Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can also be used. In particular, the phenol component can be selected from the group consisting of phenol; alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; halogen-substituted phenols such as p-chlorophenol; catechol, hydroquinone, bisphenol A and bisphenol F. Preferably, about 95 wt % or more of the phenol component comprises phenol (monohydroxybenzene).

The aldehyde component of the phenol-aldehyde resin can also include a variety of substituted and unsubstituted aldehyde compounds. Illustrative aldehyde compounds can include, but are not limited to, the so-called masked aldehydes or aldehyde equivalents, such as acetals or hemiacetals. Specific examples of suitable aldehyde compounds can include, but are not limited to, formaldehyde, acetaldehyde, propionaldehyde, butyraldehyde, furfuraldehyde, benzaldehyde, or any combination thereof. In at least one specific embodiment, the aldehyde component can be formaldehyde. Formaldehyde for making suitable phenol-formaldehyde resins is available in many forms. Paraform (solid, polymerized formaldehyde) and formalin solutions (aqueous solutions of formaldehyde, sometimes with methanol, in 37 percent, 44 percent, or 50 percent formaldehyde concentrations) are commonly used forms. Formaldehyde gas is also available. Any of these forms is suitable for use in preparing a phenol-formaldehyde resin.

Phenol-formaldehyde resins can be prepared under alkaline reaction conditions using a molar excess of formaldehyde (along with any other reactive aldehyde component(s)) relative to the phenol component, e.g., phenol. The molar ratio of formaldehyde to phenol (F:P) in the phenol-formaldehyde resin ranges from about 1.1:1 to about 6:1, from about 1.3 to about 5:1, or from about 1.5:1 to about 4:1. When synthesized, such resins typically contain a low level of residual "free" phenol component and a much larger amount of residual "free," i.e. unreacted formaldehyde. Prior to any formaldehyde scavenging, the phenol-formaldehyde resin can be characterized by a free formaldehyde content ranging from 0.2 wt % to about 18 wt % of the aqueous phenol-formaldehyde resin.

Suitable phenol-formaldehyde resins can be as discussed and described in U.S. Patent Application Publication Nos. 2008/0064799 and 2008/0064284. In these published patent applications, the formation of tetradimer is suppressed by the addition of a sulfite and/or sulfate source during the preparation of the phenol-formaldehyde resin. Other phenol-formaldehyde resins can be prepared under acidic reaction conditions, such as novolac resins and inverted novolac resins. Suitable novolac resins and inverted novolac resins can be as discussed and described in U.S. Pat. Nos. 5,670,571 and 6,906,130 and U.S. Patent Application Publication No. 2008/0280787.

The phenol-aldehyde resin can be extended through the addition of urea. The phenol-aldehyde resin can be extended through the addition of any desired amount of urea. For example, phenol-aldehyde resin extended with urea can have a urea concentration ranging from a about 1 wt % to about 50 wt %, based on the combined weight of the urea and the phenol-aldehyde resin. In another example, phenol-aldehyde resin extended with urea can have a urea concentration ranging from a low of about 5 wt %, about 15 wt %, or about 25 wt % to a high of about 35 wt %, about 40 wt %, or about 45 wt %, based on the combined weight of the urea and the phenol-aldehyde resin.

The optional urea can be added to the phenol-aldehyde resin by mixing, blending, or any other process to produce a "premix." The premix can be agitated to homogeneity. After forming the premix, the premix can be allowed to react or prereact for a period of time. For example, the premix can be allowed to react for about 5 hours or more, about 10 hours or more, about 15 hours or more, about 20 hours or more, or about 25 hours or more, after which time it can be stored at 65° F. and used to prepare a binder composition for up to approximately four days. Premixing the urea with the phenol-aldehyde resin can reduce the level of free formaldehyde in the phenol-formaldehyde resin to a level that does not increase the ammonia demand of binder solutions prepared with the premix.

One or more additional additives can be added to the binder composition. For example, one or more catalysts for accelerating the cure of the phenol-aldehyde resin such as sodium or ammonium sulfate, melamine, melamine-formaldehyde adducts, silicon-based coupling or compatibilizing agents, corrosion inhibitors, dispersants, biocides, viscosity modifiers, pH adjusters, surfactants, lubricants, defoamers, and any combination thereof can be added to the binder composition.

The mixture of Maillard reactants can include, but are not limited to, a source of a carbohydrate (carbohydrate reactant) and an amine reactant capable of participating in a Maillard reaction with the carbohydrate reactant. In another example, the mixture of Maillard reactants can include a partially pre-reacted mixture of the carbohydrate reactant and the amine reactant. The extent of any pre-reaction can preserve the ability of the mixture of Maillard reactants to be blended with the modifier, e.g. the copolymer of styrene and at least one of maleic anhydride and maleic acid (SMA), and with any other components desired to be added into binder composition.

The source of the carbohydrate can include one or more reactants having one or more reducing sugars, one or more reactants that yields one or more reducing sugars under thermal curing conditions, or a combination thereof. A reducing sugar can be a sugar that contains aldehyde groups, or can isomerize, i.e., tautomerize, to contain aldehyde groups. Such aldehyde groups are reactive with an amino group (amine reactant) under Maillard reaction conditions. Usually such aldehyde groups can also be oxidized with, for example, $Cu^{+2}$ to afford carboxylic acids. The carbohydrate reactant can optionally be substituted with other functional groups, such as with hydroxy, halo, alkyl, alkoxy, and the like. The carbohydrate source can also possess one or more chiral centers. The carbohydrate source can also include each possible optical isomer at each chiral center. Various mixtures, including racemic mixtures, or other diastereomeric mixtures of the various optical isomers of any such carbohydrate source, as well as various geometric isomers thereof, can be used.

The carbohydrate source can be nonvolatile. Nonvolatile carbohydrate sources can increase or maximize the ability of the carbohydrate reactant to remain available for reaction with the amine reactant under Maillard reaction conditions, including the curing conditions for curing the binder composition. Partially pre-reacting the mixture of the source of the carbohydrate and the amine reactant can expand the list of suitable carbohydrate sources. The carbohydrate source can be a monosaccharide in its aldose or ketose form, including a triose, a tetrose, a pentose, a hexose, or a heptose; or a polysaccharide, or any combination thereof.

If a triose serves as the carbohydrate source, or is used in combination with other reducing sugars and/or a polysaccharide, an aldotriose sugar or a ketotriose sugar can be utilized, such as glyceraldehyde and dihydroxyacetone, respectively. If a tetrose serves as the carbohydrate source, or is used in combination with other reducing sugars and/or a polysaccharide, aldotetrose sugars, such as erythrose and threose; and ketotetrose sugars, such as erythrulose, can be utilized. If a pentose serves as the carbohydrate source, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, can be utilized. If a hexose serves as the carbohydrate source, or is used in combination with other reducing sugars and/or a polysaccharide, aldohexose sugars, such as glucose (i.e., dextrose), mannose, galactose, allose, altrose, talose, gulose, and idose; and ketohexose sugars, such as fructose, psicose, sorbose and tagatose, can be utilized. If a heptose serves as the carbohydrate source, or is used in combination with other reducing sugars and/or a polysaccharide, a ketoheptose sugar such as sedoheptulose can be utilized. Other stereoisomers of such carbohydrate sources not known to occur naturally are also contemplated to be useful in preparing the binder compositions. If a polysaccharide serves as the carbohydrate source, or is used in combination with monosaccharides, then sucrose, lactose, maltose, starch, and cellulose can be utilized.

The carbohydrate reactant can also be used in combination with a non-carbohydrate polyhydroxy reactant. Examples of non-carbohydrate polyhydroxy reactants can include, but are not limited to, trimethylolpropane, glycerol, pentaerythritol, polyvinyl alcohol, partially hydrolyzed polyvinyl acetate, fully hydrolyzed polyvinyl acetate, and mixtures thereof. The non-carbohydrate polyhydroxy reactant can be sufficiently nonvolatile to maximize its ability to remain available for reaction with other binder components during curing. Partially pre-reacting the mixture of the source of the carbohydrate (carbohydrate reactant) and the amine reactant can expand the list of suitable non-carbohydrate polyhydroxy reactants. The hydrophobicity of the non-carbohydrate polyhydroxy reactant can be a factor in determining the physical properties of the binder composition.

The amine reactant capable of participating in a Maillard reaction with the source of the carbohydrate can be a compound possessing an amino group. The compound can be present in the form of an amino acid. The free amino group can also come from a protein where the free amino groups are available in the form of, for example, the $\epsilon$-amino group of lysine residues, and/or the $\alpha$-amino group of the terminal amino acid. The amine reactant can also be formed separately or in situ by using a polycarboxylic acid ammonium salt reactant. Ammonium salts of polycarboxylic acids can be generated by neutralizing the acid groups of a polycarboxylic acid with an amine base, thereby producing polycarboxylic acid ammonium salt groups. Complete neutralization, i.e., about 100% calculated on an equivalents basis, can eliminate any need to titrate or partially neutralize acid groups in the polycarboxylic acid(s) prior to binder formation. However, it is expected that less-than-complete neutralization also would not inhibit formation of the binder. To reiterate, neutralization of the acid groups of the polycarboxylic acid(s) can be carried out either before or after the polycarboxylic acid(s) is mixed with the carbohydrate(s).

Suitable polycarboxylic acids can include dicarboxylic acids, tricarboxylic acids, tetracarboxylic acids, pentacarboxylic acids, and the like, monomeric polycarboxylic acids, anhydrides, and any combination thereof, as well as polymeric polycarboxylic acids, anhydrides, and any combination thereof. Preferably, the polycarboxylic acid ammonium salt reactant is sufficiently non-volatile to maximize its ability to remain available for reaction with the carbohydrate reactant of a Maillard reaction. Again, partially pre-reacting the mixture of the source of the carbohydrate and the amine reactant can expand the list of suitable amine reactants, including polycarboxylic acid ammonium salt reactants. In another example, polycarboxylic acid ammonium salt reactants can be substituted with other chemical functional groups.

Illustrative monomeric polycarboxylic acids can include, but are not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Other suitable polycarboxylic acids can include unsaturated aliphatic tricarboxylic acids, saturated aliphatic tricarboxylic acids such as citric acid, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids can be optionally substituted, such as with hydroxy, halo, alkyl, alkoxy, and the like. Other suitable polycarboxylic acids can include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the KOLBE-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and any combination thereof.

Suitable polymeric polycarboxylic acids can include organic polymers or oligomers containing more than one pendant carboxy group. The polymeric polycarboxylic acid can be a homopolymer or copolymer prepared from unsaturated carboxylic acids that can include, but are not limited to, acrylic acid, methacrylic acid, crotonic acid, isocrotonic acid, maleic acid, cinnamic acid, 2-methylmaleic acid, itaconic acid, 2-methylitaconic acid, $\alpha,\beta$-methyleneglutaric acid, and the like. The polymeric polycarboxylic acid can also be prepared from unsaturated anhydrides. Unsaturated anhydrides can include, but are not limited to, maleic anhydride, itaconic anhydride, acrylic anhydride, methacrylic anhydride, and the like, as well as mixtures thereof. Methods for polymerizing these acids and anhydrides are well-known in the chemical art.

Preferred polymeric polycarboxylic acids can include polyacrylic acid, polymethacrylic acid, polymaleic acid, and the like. Examples of commercially available polyacrylic acids include AQUASET-529 (Rohm & Haas, Philadelphia, Pa., USA), CRITERION 2000 (Kemira, Helsinki, Finland, Europe), NF1 (H. B. Fuller, St. Paul, Minn., USA), and SOKALAN (BASF, Ludwigshafen, Germany, Europe). With respect to SOKALAN, this is believed to be a water-soluble polyacrylic copolymer of acrylic acid and maleic acid, having a molecular weight of approximately 4,000. AQUASET-529 is understood to be a composition containing polyacrylic acid cross-linked with glycerol, also containing sodium hypophosphite as a catalyst. CRITERION 2000 is thought to, be an acidic solution of a partial salt of polyacrylic acid, having a molecular weight of approximately 2,000. NF1 is believed to be a copolymer containing carboxylic acid functionality and hydroxy functionality, as well as units with neither functionality; NF1 is also thought to contain chain transfer agents, such as sodium hypophosphite or organophosphate catalysts.

The amine base for reaction with the polycarboxylic acid can include, but is not limited to, ammonia, a primary amine, i.e., $NH_2R^1$, and a secondary amine, i.e., $NHR^1R^2$, where $R^1$ and $R^2$ are each independently selected from the group consisting of: an alkyl, a cycloalkyl, an alkenyl, a cycloalkenyl, a heterocyclyl, an aryl, and a heteroaryl group. The amine base can be volatile or substantially non-volatile under conditions sufficient to promote reaction among the mixture of Maillard reactants during any partial pre-reaction or during thermal cure of the binder composition. Suitable amine bases can include, but are not limited to, a substantially volatile base, a substantially non-volatile base, or a combination thereof. Illustrative substantially volatile bases can include, but are not limited to, ammonia, ethylamine, diethylamine, dimethylamine, ethylpropylamine, or any combination thereof. Illustrative substantially non-volatile bases can include, but are not limited to, aniline, 1-naphthylamine, 2-naphthylamine, para-aminophenol, or any combination thereof.

One particular example of the mixture of Maillard reactants includes a mixture of aqueous ammonia, citric acid, and dextrose (glucose). It is believed that the mixture of aqueous ammonia, citric acid, and dextrose is representative of Knauf Insulation's ECOSE® Technology. In this mixture, the ratio of the number of molar equivalents of acid salt groups present on the polycarboxylic, citric acid reactant (produced upon neutralization of the —COOH groups of the citric acid by ammonia) to the number of molar equivalents of hydroxyl groups present on the carbohydrate reactant(s) can range from about 0.04:1 to about 0.15:1. After curing, this formulation results in a water-resistant, cured thermoset binder. Thus, in one embodiment, the number of molar equivalents of hydroxyl groups present on the dextrose, carbohydrate reactant can be about twenty five-fold greater than the number of molar equivalents of acid salt groups present on the polycarboxylic, citric acid reactant. In another embodiment, the number of molar equivalents of hydroxyl groups present on the dextrose carbohydrate reactant is about ten-fold greater than the number of molar equivalents of acid salt groups present on the polycarboxylic citric acid reactant. In yet another embodiment, the number of molar equivalents of hydroxyl groups present on the dextrose carbohydrate reactant is about six-fold greater than the number of molar equivalents of acid salt groups present on the polycarboxylic citric acid reactant.

As noted above, the mixture of Maillard reactants can include a source of a carbohydrate and an amine reactant capable of participating in a Maillard reaction therewith. Also, as noted above, the mixture of Maillard reactants can include a partially reacted mixture of a source of a carbohydrate and an amine reactant. For example, the source of a carbohydrate can be mixed with an amine reactant capable of participating in a Maillard reaction with the source of the carbohydrate and the mixture can be heated to about 90° C. for a time sufficient to initiate the Maillard reaction(s), but not allow the reaction(s) to proceed to completion, before finally formulating the binder composition.

As the case with the phenol-formaldehyde resin, a binder composition that includes a mixture of Maillard reactants can also include other ingredients commonly used in such compositions such as urea, one or more catalysts for accelerating the cure of the resin such as sodium or ammonium sulfate, melamine, melamine-formaldehyde adducts, silicon-based coupling or compatibilizing agents, corrosion inhibitors, dispersants, biocides, viscosity modifiers, pH adjusters, surfactants, lubricants, defoamers, and the like, and any combination thereof.

To prepare the binder composition, the phenol-aldehyde resin, the mixture of Maillard reactants, or a combination thereof, and the one or modifiers, e.g. a copolymer that includes styrene and at least one of maleic anhydride and maleic acid, can be mixed in a desired proportion under ambient conditions. In order to insure suitable storage stability of the binder composition and proper performance during use of the binder composition, it can be useful to adjust the pH of the binder composition to within the range of about 5 to about 12, about 6 to about 10, or about 7 to about 9. Too low a pH can cause premature curing of the binder composition and possibly incompatibility of the binder constituents; while too high of a pH may retard curing of the binder composition on heating during use unless additional curing catalyst is added.

On a solids basis, the weight ratio of the phenol-aldehyde resin, the mixture of Maillard reactants, or a combination thereof to the modifier or combination of modifiers in the binder composition can be between about 99.9:0.1 and about 70:30, or between about 99.8:0.2 to about 90:10, or between 99.8:0.2 to about 95:5. Other suitable weigh ratios of the phenol-aldehyde resin, the mixture of Maillard reactants, or a combination thereof to the modifier or combination of modifiers in the binder composition can be about 75:25; about 80:20; about 85:15, and about 90:10. In another example, the amount of the phenol-aldehyde resin, the mixture of Maillard reactants, or a combination thereof in the binder composition can range from a low of about 80 wt %, about 85 wt % or about 90 wt % to a high of about 95 wt %, about 96 wt %, about 97 wt %, about 98 wt %, about 99 wt %, about 99.5 wt %, or about 99.9 wt %, based on the combined weight of the phenol-aldehyde resin, the mixture of Maillard reactants, or a combination thereof and the modifier or combination of modifiers in the binder composition. In another example, the amount of the phenol-aldehyde resin, the mixture of Maillard reactants, or a combination thereof in the binder composition can range from a low of about 83 wt %, about 88 wt % or about 92 wt % to a high of about 95.5 wt %, about 96.5 wt %, about 97.5 wt %, about 98.5 wt %, about 99.5 wt %, or about 99.8 wt %, based on the combined weight of the phenol-aldehyde resin, the mixture of Maillard reactants, or a combination thereof and the modifier or combination of modifiers in the binder composition.

For a binder composition that includes two or more modifiers, the two or more modifiers can be present in any desired proportion or amount with respect to one another. For example, a binder composition that includes, as the modifier, the copolymer comprising one or more vinyl aromatic derived units and at least one of maleic anhydride and maleic acid and a latex, the copolymer comprising one or more vinyl aromatic derived units and at least one of maleic anhydride and maleic acid can be present in an amount ranging from about 1 wt % to about 99 wt %, based on the combined weight of the copolymer comprising one or more vinyl aromatic derived units and at least one of maleic anhydride and maleic acid and the latex. Similarly, if the binder composition includes three or more modifiers, the three or more modifiers can be present in any desired proportion or amount with respect to one another.

The total concentration of non-volatile components in the aqueous binder composition can also vary, but it will usually be found convenient and satisfactory to prepare this composition at total solids concentration in the range from about 1 wt % to about 40 wt %, based on the total weight of the aqueous binder composition. In another example, the total solids concentration of the binder composition can range from a low of about 3 wt %, about 5 wt %, about 10 wt %, or about 15 wt % to a high of about 20 wt %, about 25 wt %, about 30 wt %, or about 40 wt %. As used herein, the solids content of the binder composition is measured by the weight loss upon heating a small, e.g., 1-5 gram, sample of the composition at about 105° C. for a time sufficient to remove any water. As explained above, the binder composition may also contain a variety of other known additives such as urea, silicon coupling agents, catalysts, corrosion inhibitors, antifoamers, biocides, pigments, and the like, normally in small proportions relative to the phenol-aldehyde resin, the mixture of Maillard reactants, or a combination thereof and the modifier or combination of modifiers in the binder composition.

The amount of the binder composition applied to the fiberglass can vary. For example, the amount of the binder composition can range from about 3 wt % to about 45 wt %, from about 10 wt % to about 40 wt %, or from about 15 wt % to about 30 wt %, of the binder composition based on the dry weight of the fiberglass product. In another example, the amount of the binder composition can range from a low of about 3 wt %, about 5 wt %, or about 8 wt % to a high of about 15 wt %, about 25 wt %, or about 35 wt %, based on the dry weight of the fiberglass product. The amount of the binder composition or binder loading can normally be confirmed by measuring the percent loss on ignition ("LOI") of the fiberglass product. An important advantage of the binder composition is that acceptable tensile properties of the fiberglass product can be obtained at a lower LOI (i.e., at a lower binder level) than can be obtained using a comparable binder not having the added SMA copolymer.

The binder composition can be applied to fiberglass, e.g., glass fibers, as it is being produced and formed into a mat, water can be volatilized from the binder composition, and the binder-coated fiberglass mat can be heated to cure the binder composition or binder thereby producing a finished fiberglass (fibrous glass) bat which can be used, for example, as a thermal or acoustical insulation product, a reinforcement for a subsequently produced composite, etc. The binder composition can set or cure at elevated temperatures. The setting or curing of the binder composition can occur at temperatures from about 150° C. to about 300° C. The binder composition can typically be cured in a time ranging from about 2 seconds to about 60 seconds. Although the binder composition can possibly cure more rapidly at higher temperatures, excessively high temperatures can cause deterioration of the binder composition, which in turn can cause a deterioration of the physical and/or functional properties of the fiberglass product.

FIG. 1 depicts a schematic of an illustrative system 100 for making a fiberglass product 118, according to one or more embodiments. As depicted in FIG. 1, the manufacture of a fiberglass product 118 can be accomplished using processes where molten glass flows from a melting furnace or melting tank 110, is divided into multiple streams 111 in a fiber forming device where it is attenuated into fibers 112. The attenuation of the fibers 112 can be performed by centrifuging the molten glass though bushings or spinners 113 or by fluid jets (not shown) to form discontinuous glass fibers 112 of relatively small dimensions. The glass fibers can have a diameter ranging from a low of about 1 µm, about 3 µm, or about 5 µm to a high of about 9 µm, about 15 µm, or about 20 µm. The glass fibers can have a length ranging from a low of about 1 mm, about 5 mm, or about 10 mm to a high of about 5 cm, about 8 cm, or about 15 cm. For example, the glass fibers can have a diameter ranging from about 3 µm to about 6 µm and a length from about 1.3 cm to about 3.8 cm.

The binder composition can be an aqueous binder composition and can be applied, usually by spraying 114 or by fogging (not shown) onto the hot glass fibers emerging from the fiber attenuation mechanism so as to result in a distribution of the binder throughout the subsequently formed mat of fibrous glass. The binder-treated fibers can then be collected as the fibers randomly deposit onto a moving collector, e.g., a conveyor belt, 115. The dynamics of the binder application are such that much of the water in the binder composition evaporates as the hot fibers are cooled by contact with the aqueous binder composition. The curable binder then becomes tacky holding the mass of fibers together as the binder begins to set (e.g., cure). The fibers can be collected on the moving collector 115 in a generally haphazard manner to form, e.g., a non-woven mat 116. The depth (thickness) of the fibers forming the mat can be determined by the speed of fiber formation, the speed of the moving collector 115, or both.

The non-woven mat 116 can have any desired thickness. For example, a relatively thin non-woven mat 116, e.g., about 0.1 mm to about 6 mm thick, can be formed. In another example, a relatively thick non-woven mat 116, e.g., about 10 cm to about 50 cm thick, or about 15 cm to about 30 cm, or about 20 cm to about 30 cm, can be formed. Depending on formation conditions, the density of the product can also be varied from a relatively fluffy, low density product to a higher density product of from about 0.1 g/cm$^3$ (6 lbs/ft$^3$) to about 0.15 g/cm$^3$ (10 lbs/ft$^3$) or more.

The non-woven mat can then pass through a curing device, e.g., an oven, 117 in which the binder composition is cured, i.e. set. Heated air can be passed through the mat to cure the binder. Flights above and below the mat slightly compress the mat to give the finished product a predetermined thickness and surface finish. Typically, the curing device is operated at a temperature ranging from about 175° C. to about 315° C. The non-woven mat can be heated within the curing device 117 for about 30 seconds to about 3 minutes. For the manufacture of conventional thermal or acoustical fiberglass insulation products, the time can range from about 45 seconds to about 90 seconds. The fiberglass mat having a cured, binder matrix then emerges from the curing device 117 in the form of a bat 118 which can be compressed for packaging and shipping and which will thereafter substantially recover its as-made vertical dimension (thickness) when unconstrained. In some cases, a fibrous glass mat which is about 3.2 cm (1.25 inches) to about 18 cm (7 inches) thick as it exits from the moving collector 115, can expand to a vertical thickness of as much as about 12 cm (5 inches) to about 23 cm (9 inches) and can be slightly compressed to a vertical thickness of about 7.5 cm (3 inches) to about 15 cm (6 inches) in the curing device 117.

In one or more embodiments, the drying and curing of the binder composition can be conducted in two or more distinct steps. For example, the composition can first be heated at a temperature and for a time sufficient to substantially dry but not to substantially cure the binder composition and then heated for a second time at a higher temperature and/or for a longer period of time to effect curing (cross-linking to a thermoset structure). Such a preliminary procedure, referred to as "B-staging", may be used to provide a binder-treated product, for example, in roll form, which may at a later stage be fully cured, with or without forming or molding into a particular configuration, concurrent with the curing process. This makes it possible, for example, to use fiberglass products which can be molded and cured elsewhere.

In one or more embodiments, a method for binding loosely associated, a non-woven mat or blanket of fibers can include, but is not limited to (1) contacting the fibers with the binder composition and (2) heating the binder composition to an elevated temperature, which temperature is sufficient to at least partially cure the binder composition. Preferably, the binder composition is cured at a temperature ranging from about 75° C. to about 300° C., usually at a temperature between about 100° C. and up to a temperature of about 250° C. The binder composition can be cured at an elevated temperature for a time ranging from about 1 second to about 15 minutes. The particular curing time can depend, at least in part, on the type of oven or other heating device design and/or production or line speed.

As used herein, the terms "curing," "cured," and similar terms are intended to embrace the structural and/or morphological change that occurs in an aqueous binder composition, such as by covalent chemical reaction (crosslinking), ionic interaction or clustering, improved adhesion to the substrate, phase transformation or inversion, and/or hydrogen bonding when the binder composition is dried and heated to cause the properties of a flexible, porous substrate, such as a mat or blanket of fibers, especially glass fibers, to which an effective amount of the binder composition has been applied, to be altered.

Alternatively or in addition to heating the fiberglass product, catalytic curing can be used to cure the fiberglass product. Catalytic curing of the fiberglass product can include the addition of an acid catalyst. Illustrative acid catalysts can include, but are not limited to, ammonium chloride or p-toluenesulfonic acid.

As used herein, the term "cured binder" refers to the cured product of the binder composition that includes the phenol-aldehyde resin, the mixture of Maillard reactants, or a combination thereof and the modifier or combination of modifiers, and any other additives, such that the cured product bonds the fibers of a fibrous product together. Generally, the bonding occurs at the intersection of overlapping fibers.

As used herein, the terms "fiber," "fibrous," "fiberglass," "fiber glass," "glass fibers," and the like are refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers ("WUCS"). Wet use chopped strand glass fibers can be formed by conventional processes known in the art. The WUCS can have a moisture content ranging from a low of about 5%, about 8%, or about 10% to a high of about 20%, about 25%, or about 30%.

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

The binder compositions discussed and described above or elsewhere herein can be used to produce a variety of fiberglass products. The fiberglass products can be used by themselves or incorporated into a variety of other products. For example, fiberglass products can be used as or incorporated into insulation baits or rolls, composite flooring, asphalt roofing shingles, siding, gypsum wall board, roving, microglass-based substrate for printed circuit boards, battery separators, filter stock, tape stock, carpet backing, and as reinforcement scrim in cementitious and non-cementitious coatings for masonry.

In one or more embodiments, fiberglass mats containing one or more of the binder compositions disclosed herein can have an average dry tensile strength of at least 50 lbs/3 inch; at least 60 lbs/3 inch, at least 70 lbs/3 inch, at least 80 lbs/3 inch, at least 90 lbs/3 inch, at least 100 lbs/3 inch, at least 110 lbs/3 inch, at least 120 lbs/3 inch, at least 130 lbs/3 inch, at least 140 lbs/3 inch, at least 150 lbs/3 inch, at least 160 lbs/3 inch, at least 170 lbs/3 inch, at least 180 lbs/3 inch, at least 190 lbs/3 inch, or at least 200 lbs/3 inch. For example, fiberglass mats containing one or more of the binder compositions disclosed herein can have an average dry tensile strength of from about 60 lbs/3 inch to about 120 lbs/3 inch, or from about 90 lbs/3 inch to about 145 lbs/3 inch, or from about 100 lbs/3 inch to about 150 lbs/3 inch.

In one or more embodiments, fiberglass mats containing one or more of the binder compositions disclosed herein can have an average tear strength of about 250 grams force ("gf"), about 275 gf, about 300 gf, about 325 gf, about 350 gf, about 375 gf, about 400 gf, about 425 gf, 450 gf, about 475 gf, about 500 gf, about 525 gf, about 550 gf, about 575 gf, about 600 gf, about 625 gf, about 650 gf, about 675 gf, about 700 gf, about 725 gf, about 750 gf, about 775 gf, or about 800 gf. In one or more embodiments, fiberglass mats containing one or more of the binder compositions disclosed herein can have an average tear strength of at least 325 gf, at least 350 gf, at least 375 gf, at least 400 gf, at least 425 gf, at least 450 gf, or at least 475 gf. In one or more embodiments, fiberglass mats containing one or more of the binder compositions disclosed herein can have an average tear strength of at least 485 gf, at least 490 gf, at least 495 gf, at least 500 gf, at least 505 gf, at least 510 gf, at least 515 gf, at least 520 gf, at least 525 gf, at least 530 gf, at least 535 gf, at least 540 gf, at least 545 gf, at least 550 gf, at least 555 gf, at least 560 gf, at least 565 gf, at least 570 gf, or at least 575 gf. In one or more embodiments, fiberglass mats containing one or more of the binder compositions disclosed herein can have an average tear strength ranging from a low of about 500 gf, about 525 gf, about 550 gf, or about 575 gf to a high of about 590 gf, about 620 gf, about 650 gf, about 700 gf, about 750 gf, about 800 gf, about 850 gf, or about 900 gf.

In one or more embodiments, fiberglass mats containing one or more of the binder compositions disclosed herein can have a basis weight ("BW") ranging from a low of about 0.5 lbs/100 ft$^2$, about 0.7 lbs/100 ft$^2$, about 0.9 lbs/100 ft$^2$, about 1 lbs/100 ft$^2$, about 1.2 lbs/100 ft$^2$, about 1.4 lbs/100 ft$^2$, about 1.5 lbs/100 ft$^2$, about 1.6 lbs/100 ft$^2$, about 1.7 lbs/100 ft$^2$, or about 1.8 lbs/100 ft$^2$ to a high of about 2 lbs/100 ft$^2$, about 2.1 lbs/100 ft$^2$, about 2.2 lbs/100 ft$^2$, about 2.3 lbs/100 ft$^2$, about 2.4 lbs/100 ft$^2$, about 2.5 lbs/100 ft$^2$, about 2.7 lbs/100 ft$^2$, about 2.9 lbs/100 ft$^2$, or about 3 lbs/100 ft$^2$. For example, the fiberglass mats can have a basis weight of about 1.65 lbs/100 ft$^2$, about 1.75 lbs/100 ft$^2$, about 1.85 lbs/100 ft$^2$, about 1.95 lbs/100 ft$^2$, or about 2.1 lbs/100 ft$^2$.

In one or more embodiments, fiberglass mats containing one or more of the binder compositions disclosed herein can have a percent of hot-wet retention ("% HW") of greater than about 50%, about 55%, about 60%, about 65%, about 70%, about 75%, about 80%, or about 85%. For example, the %

HW can range from about 50% to about 80%, about 55% to about 85%, or about 60% to about 80%.

EXAMPLES

To provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

In Example I, the effect a water-solubilized SMA copolymer (2 wt %, based on the weight of the phenol-formaldehyde resin) had on the tensile properties of fiberglass hand sheets was evaluated. The phenol-formaldehyde resin was of the type discussed and described in U.S. Patent Application Publication No. 2008/0064799. The SMA copolymer had a molecular weight of 25,000. The SMA copolymer was purchased from Polyscope and had product number SZ 33020.

Premixes were prepared by mixing 324 parts by weight ("pbw") of the phenol-formaldehyde resin with 180 pbw of a 40 wt % aqueous urea solution. The premix had a solids content of about 45 wt %. The premix was allowed to pre-react overnight at room temperature.

Binder compositions having about 10 wt % solids were prepared by thoroughly mixing the various binder ingredients in a 0.5 gallon jar. An inventive example (Example 1) and a comparative example (CE 1) were prepared.

For the comparative example CE 1, the base binder had about 221.5 pbw of the premix (amounting to 100 pbw premix solids), 8 pbw ammonium sulfate solids (supplied as 40 pbw of a 20% by weight aqueous solution), 2 pbw ammonia and the balance water. For Example 1, the binder composition was prepared by further adding about 2 pbw of pre-solubilized Polyscope SMA copolymer (supplied as 15.4 pbw of a 13 wt % aqueous solution) to the base binder. Additional ammonia was used to solubilize the SMA before the SMA solution was added to the binder.

Hand sheets were prepared using these binder compositions by making a sheet of glass fibers using PPG Wet Chopped Stand (Product 8007, nominal 12.7 mm fibers), soaking the sheet in the respective binder composition, vacuuming excess binder off the sheet, and curing the binder-soaked sheet in an oven at 205° C. for 90 seconds. Each hand sheet was then cut into six 3×5 inch pieces. Dry tensile strengths of the mats were measured by subjecting each hand sheet to breaking in a tensile tester (QC-1000 Materials Tester by the Thwing Albert Instrument Co.). Hot/Wet tensile strengths of the hand sheets were measured by initially soaking the hand sheets in 85° C. water for 10 minutes followed by breaking them in the tensile tester (QC-1000 Materials Tester by the Thwing Albert Instrument Co.) while the samples were still warm wet.

Figure 2:
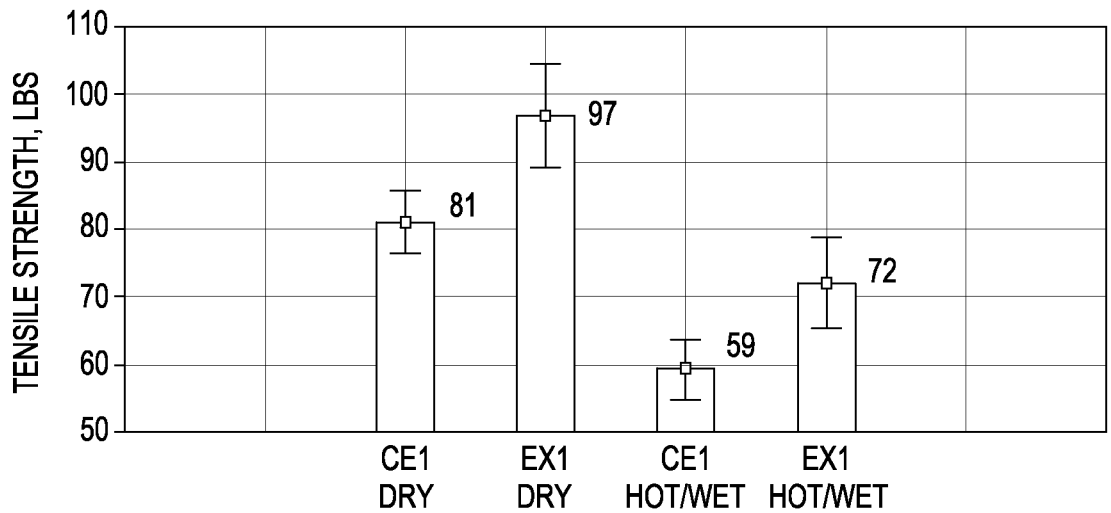
FIG. 2 shows a graphical depiction of dry and hot/wet tensile test results comparing hand sheets made with a control binder containing a phenol-formaldehyde resin to hand sheets made with a modified, phenol-formaldehyde resin binder, according to one or more embodiments described.

Results are depicted in FIG. 2 and show the mean tensile strength and the 95% confidence interval. As shown both dry and hot/wet tensile strength for Example I increased significantly when the solubilized SMA was added to the phenol-formaldehyde-based binder as compared to the comparative example (CE 1).

Example II

In Example II, the effect a water-solubilized SMA copolymer (2 wt %, based on the weight of the phenol-formaldehyde resin) had on the tensile properties of fiberglass hand sheets was evaluated. The same phenol-formaldehyde resin used in Example I was also used in Example II. The SMA copolymer had a molecular weight of about 120,000. The SMA copolymer was also purchased from Polyscope, but had product number SZ 26120.

A premix was prepared by mixing 787.5 pbw of the phenol-formaldehyde resin with 367.5 pbw of a 40 wt % aqueous urea solution. The premix had a solids content of about 45 wt %. The premix was allowed to pre-react overnight at room temperature.

Two inventive examples (Ex. 2 and Ex. 3) and two comparative examples (CE 2 and CE 3), were prepared. Binder compositions having about 8 wt % solids (Ex. 2 and CE 2) and about 10 wt % solids (Ex. 3 and CE 3) were prepared by thoroughly mixing the various binder ingredients in a 0.5 gallon jar. The base binder (comparative) had about 286.5 pbw of the premix (amounting to about 130 pbw premix solids), 10.4 pbw ammonium sulfate solids (supplied as 52.65 pbw of a 20% by weight aqueous solution), 2.6 pbw ammonia, 0.26 pbw A1102 Silane, and the balance was water. For the 10% binder, 958.1 pbw water was used; for the 8% binder, 1283.1 pbw water was used. The inventive examples (Ex. 2 and Ex. 3), were prepared by further adding 2.6 pbw of pre-solubillized Polyscope SMA (supplied as 20 pbw of a 13% by weight aqueous solution) to the base (comparative) binder compositions. Additional ammonia and sodium hydroxide were used to prepare the SMA solution separate from its addition to the binder.

Hand sheets were prepared according to the same procedure used in Example I. The percent loss on ignition (% LOI) was measured by weighing the sheets, ashing them at 650° C. and then re-weighing the residue.

Figure 3:
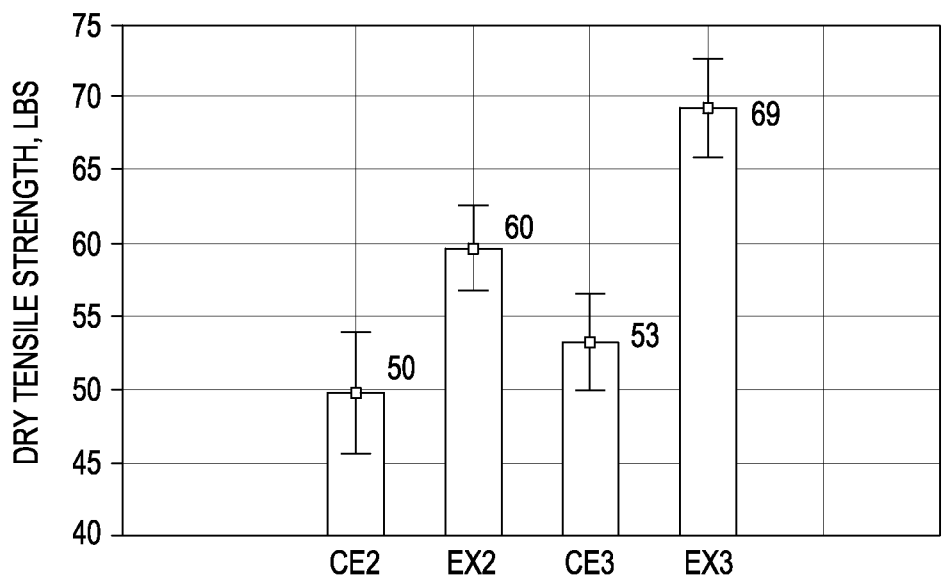
FIG. 3 shows a graphical depiction of dry tensile test results comparing hand sheets made with a control binder containing a phenol-formaldehyde resin to hand sheets made with a modified, phenol-formaldehyde resin binder, according to one or more embodiments described.
Figure 4:
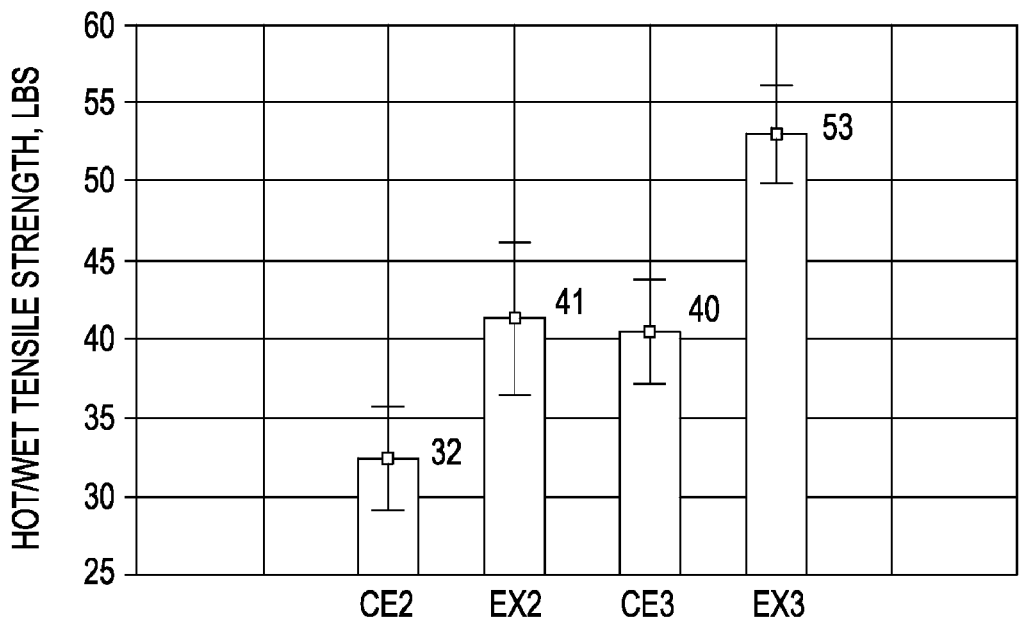
FIG. 4 shows a graphical depiction of hot/wet tensile test results comparing hand sheets made with a control binder containing a phenol-formaldehyde resin to hand sheets made with a modified, phenol-formaldehyde resin binder, according to one or more embodiments described.
Figure 5:
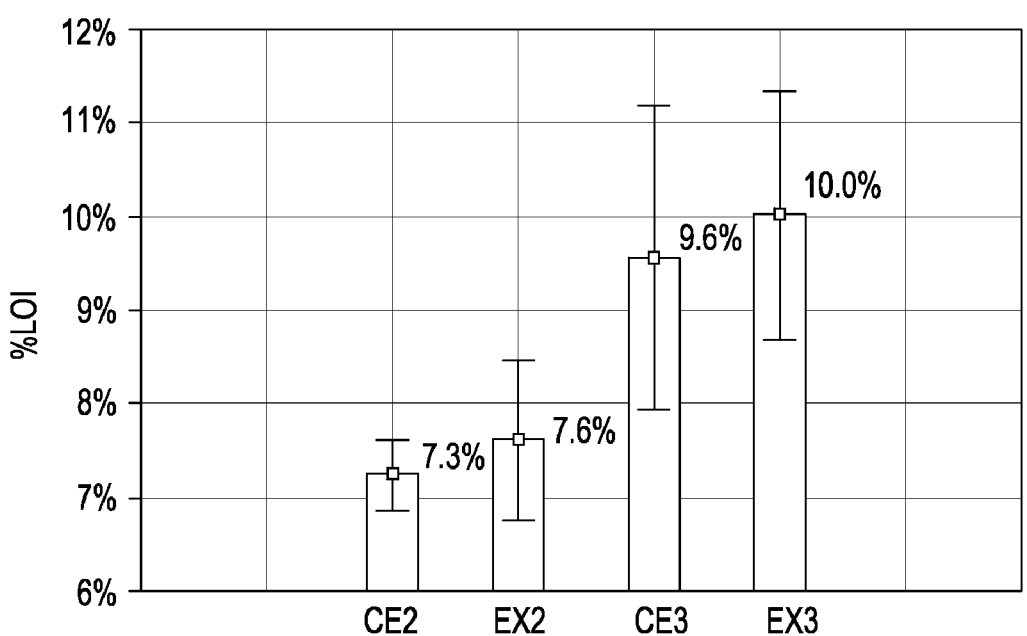
FIG. 5 shows a graphical depiction of loss on ignition (% LOI) values for the hand sheets depicted in FIGS. 3 and 4.

The results of the tensile tests are graphically depicted in FIGS. 3, 4 and 5. FIG. 3 is a graphical depiction of the dry tensile test results and FIG. 4 is a graphical depiction of the hot/wet tensile test results. FIG. 5 is a graphical depiction of the percent loss on ignition (% LOI) values of the hand sheets. The results show the mean values and the 95% confidence interval. As shown, the actual measured % LOIs for Ex. 2 and 3 and CE 2 and 3 were very close to the targeted values of 8 wt % and 10 wt %. Also, as shown, both the dry and hot/wet tensile strengths increased significantly for Ex. 2 and Ex. 3, as compared to the comparative examples CE 2 and CE 3. Indeed, the dry and the hot/wet tensile strengths of the SMA-modified binder at the lower LOI were higher than the corresponding tensile strengths of the control binder at the higher LOI.

Example III

In Example III, the effect a water-solubilized SMA copolymer (2 wt %, based on the total weight of the insulation binder solids) had on the tensile properties of fiberglass hand sheets was evaluated. The base binder composition included a mixture of Maillard reactants, namely ammonia, citric acid, and dextrose. The SMA copolymer was the same SMA copolymer used in Example II.

One inventive example (Ex. 4) and one comparative example (CE 4) were prepared. The binder compositions for Ex. 4 and CE 4 both had about 20 wt % solids, by thoroughly mixing the various binder ingredients in a 0.5 gallon jar. The base binder (comparative) had about 26.66 pbw of a 28 wt % ammonia solution, 24.78 pbw citric acid, 148.58 pbw dextrose (glucose) and 704.10 pbw water. The inventive example (Ex. 4) was prepared by further adding about 30.77 pbw of a 13 wt % of the pre-solubilized Polyscope SMA copolymer and about 69333 pbw water to produce. Accordingly, the binder composition for Ex. 4 included about 2 wt % of the SMA copolymer. Additional ammonia and sodium hydroxide were used to solubilize the SMA separate from the binder preparation. Hand sheets were prepared according to the same procedure used in Example I.

Figure 6:
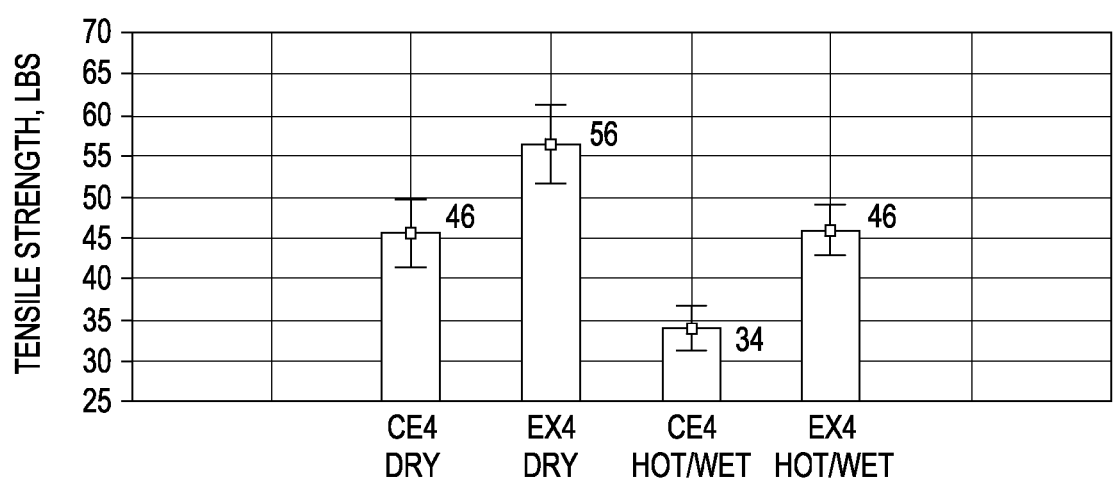
FIG. 6 shows a graphical depiction of dry and hot/wet tensile test results comparing hand sheets made with a control binder containing a mixture of Maillard reactants to hand sheets made with a binder containing a modified mixture of Maillard reactants, according to one or more embodiments described.

FIG. 6 is a graphical depiction of the dry and hot/wet tensile test results comparing Ex. 4 and CE 4. The results present mean values and the 95% confidence interval. As shown, both the dry and hot/wet tensile strengths increased significantly for Ex. 4, as compared to the comparative examples CE 4.

Embodiments of the present invention further relate to any one or more of the following paragraphs:

1. A binder composition, comprising a phenol-aldehyde resin or a mixture of Maillard reactants; and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes.

2. The binder composition of paragraph 1, wherein the vinyl aromatic derived units comprise styrene.

3. The binder composition of paragraph 1 or 2, wherein the mixture of Maillard reactants comprises at least one polycarboxylic acid, at least one of ammonia and an amine, and at least one carbohydrate source.

4. The binder composition according to any of paragraphs 1 to 3, wherein the mixture of Maillard reactants comprises ammonia, citric acid, and dextrose.

5. The binder composition according to any of paragraphs 1 to 4, wherein the binder composition comprises an aqueous mixture.

6. The binder composition according to any of paragraphs 1 to 5, wherein the phenol-aldehyde resin comprises phenol-formaldehyde resin.

7. The binder composition according to any of paragraphs 1 to 6, wherein the phenol-aldehyde resin comprises a phenol-formaldehyde resin pre-reacted with urea.

8. The binder composition according to any of paragraphs 1 to 7, wherein the copolymer has a molecular weight of from about 1,000 to about 500,000.

9. The binder composition according to any of paragraphs 1 to 8, wherein the phenol-aldehyde resin or the mixture of Maillard reactants is present in an amount of from about 80 wt % to about 99 wt %, based on the combined weight of the phenol-aldehyde resin or the mixture of Maillard reactants and the one or more modifiers.

10. A fiberglass product, comprising a plurality of fibers; and an at least partially cured binder composition, comprising either a phenol-aldehyde resin or a mixture of Maillard reactants; and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes.

11. The binder composition of claim 10, wherein the vinyl aromatic derived units comprise styrene.

12. The binder composition of paragraph 10, wherein the mixture of Maillard reactants comprises at least one polycarboxylic acid, at least one of ammonia and an amine, and at least one carbohydrate source.

13. The binder composition of paragraph 10 or 11, wherein the mixture of Maillard reactants comprises ammonia, citric acid, and dextrose.

14. The binder composition according to any of paragraphs 10 to 13, wherein the phenol-aldehyde resin comprises phenol-formaldehyde resin.

15. The binder composition according to any of paragraphs 10 to 14, wherein the phenol-aldehyde resin comprises a phenol-formaldehyde resin pre-reacted with urea.

16. The binder according to any of paragraphs 10 to 15, wherein the copolymer has a molecular weight of from about 1,000 to about 500,000.

17. The binder composition according to any of paragraphs 10 to 16, wherein the phenol-aldehyde resin or the mixture of Maillard reactants is present in an amount of from about 80 wt % to about 99 wt %, based on the combined weight of the phenol-aldehyde resin or the mixture of Maillard reactants and the one or more modifiers.

18. A process for preparing a fiberglass product, comprising contacting a plurality of fibers with a binder composition, the binder composition comprising either a phenol-aldehyde resin or a mixture of Maillard reactants and one or more modifiers selected from the group consisting of a copolymer comprising one or more vinyl aromatic derived units and at least one of maleic anhydride and maleic acid; an adduct of styrene, at least one of maleic anhydride and maleic acid, and at least one of an acrylic acid and an acrylate; and one or more latexes; collecting the contacted fibers to form a non-woven mat; and heating the non-woven mat to at least partially cure the binder composition.

19. The binder composition of paragraph 18, wherein the vinyl aromatic derived units comprise styrene.

20. The binder composition of paragraph 18 or 19, wherein the mixture of Maillard reactants comprises at least one polycarboxylic acid, at least one of ammonia and an amine, and at least one carbohydrate source.

21. The binder composition according to any of paragraphs 18 to 20 wherein the mixture of Maillard reactants comprises ammonia, citric acid, and dextrose.

22. The binder composition according to any of paragraphs 18 to 21, wherein the binder composition comprises an aqueous mixture when contacted with the plurality of fibers.

23. The binder composition according to any of paragraphs 18 to 22, wherein the phenol-aldehyde resin comprises phenol-formaldehyde resin.

24. The binder composition according to any of paragraphs 18 to 23, wherein the phenol-aldehyde resin comprises a phenol-formaldehyde resin pre-reacted with urea.

25. The binder composition according to any of paragraphs 18 to 24, wherein the copolymer has a molecular weight of from about 1,000 to about 500,000.

26. The binder composition according to any of paragraphs 18 to 25, wherein the phenol-aldehyde resin or the mixture of Maillard reactants is present in an amount of from about 80 wt % to about 99 wt %, based on the combined weight of the phenol-aldehyde resin or the mixture of Maillard reactants and the one or more modifiers.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A fiberglass product, comprising:
   a plurality of fibers; and
   a binder composition, wherein the binder composition, prior to curing, comprises:
      a mixture of Maillard reactants; and
      one or more modifiers selected from the group consisting of:
         a copolymer comprising one or more vinyl aromatic derived units and at least one of maleic anhydride and maleic acid;
         an adduct of styrene, at least one of maleic anhydride and maleic acid, and at least one of an acrylic acid and an acrylate;
         one or more latexes, and
         any combination thereof.

2. The fiberglass product of claim 1, wherein the copolymer is present, and wherein the vinyl aromatic derived units comprise styrene.

3. The fiberglass product of claim 1, wherein the mixture of Maillard reactants comprises at least one polycarboxylic acid, at least one of ammonia and an amine, and at least one carbohydrate source.

4. The fiberglass product of claim 1, wherein the mixture of Maillard reactants comprises ammonia, citric acid, and dextrose.

5. The fiberglass product of claim 1, wherein the mixture of Maillard reactants comprises a polycarboxylic acid ammonium salt and a carbohydrate source, and wherein the one or more modifiers is the copolymer and the copolymer comprises styrene maleic anhydride.

6. The fiberglass product of claim 1, wherein the mixture of Maillard reactants comprises ammonia, citric acid, and dextrose, and wherein the one or more modifiers is the copolymer and the copolymer comprises styrene maleic anhydride.

7. The fiberglass product of claim 1, wherein the copolymer is present and has a molecular weight of about 1,000 to about 500,000.

8. The fiberglass product of claim 1, wherein the mixture of Maillard reactants is present in an amount of about 80 wt % to about 99 wt %, based on a total weight of the mixture of Maillard reactants and the one or more modifiers.

9. The fiberglass product of claim 1, wherein the one or more modifiers is selected from the group consisting of: the copolymer; the adduct; and a combination thereof.

10. The fiberglass product of claim 1, wherein the one or more modifiers is the copolymer.

11. The fiberglass product of claim 1, wherein the one or more modifiers is the adduct.

12. The fiberglass product of claim 1, wherein the copolymer is present and has a molecular weight of about 10,000 to about 500,000.

13. A process for preparing a fiberglass product, comprising:
   contacting a plurality of fibers with a binder composition, the binder composition comprising:
      a mixture of Maillard reactants; and
      one or more modifiers selected from the group consisting of:
         a copolymer comprising one or more vinyl aromatic derived units and at least one of maleic anhydride and maleic acid;
         an adduct of styrene, at least one of maleic anhydride and maleic acid, and at least one of an acrylic acid and an acrylate;
         one or more latexes; and
         any combination thereof;
   collecting the contacted fibers to form a non-woven mat; and
   heating the non-woven mat to at least partially cure the binder composition.

14. The process of claim 13, wherein the copolymer is present, and wherein the vinyl aromatic derived units comprise styrene.

15. The process of claim 13, wherein the mixture of Maillard reactants comprises at least one polycarboxylic acid, at least one of ammonia and an amine, and at least one carbohydrate source.

16. The process of claim 13, wherein the mixture of Maillard reactants comprises ammonia, citric acid, and dextrose.

17. The process of claim 13, wherein the binder composition comprises an aqueous mixture when contacted with the plurality of fibers.

18. The process of claim 13, wherein the binder composition is produced by combining the mixture of Maillard reactants with the one or more modifiers.

19. The process of claim 18, wherein the mixture of Maillard reactants comprises a polycarboxylic acid ammonium salt and a carbohydrate source, and wherein the one or more modifiers is the copolymer and the copolymer comprises styrene maleic anhydride.

20. The process of claim 13, wherein the mixture of Maillard reactants is present in an amount of about 80 wt % to about 99 wt %, based on a total weight of the mixture of Maillard reactants and the one or more modifiers.

21. The process of claim 13, wherein the one or more modifiers is selected from the group consisting of: the copolymer; the adduct; and a combination thereof.

22. The process of claim 13, wherein the one or more modifiers is the copolymer.

* * * * *